United States Patent [19]
Anderson et al.

[11] Patent Number: 5,927,927
[45] Date of Patent: Jul. 27, 1999

[54] AUTOMATIC CART LOADING MACHINE AND METHOD

[75] Inventors: Jeffrey L. Anderson; Eugene A. Koll; Charles W. Boller, all of Fridley, Minn.

[73] Assignee: C.J. Machine Inc., Fridley, Minn.

[21] Appl. No.: 08/924,936

[22] Filed: Sep. 8, 1997

[51] Int. Cl.[6] .................................................. B65G 67/00
[52] U.S. Cl. ...................... 414/331; 414/400; 414/609; 414/800
[58] Field of Search ...................... 414/331, 400, 414/401, 800, 609; 198/370.08, 418.5, 427

[56] References Cited

U.S. PATENT DOCUMENTS

| | | | |
|---|---|---|---|
| 201,049 | 3/1878 | Robertson | 414/331 |
| 3,055,518 | 9/1962 | Pearne et al. | 414/331 |
| 3,594,977 | 7/1971 | Grasvol | 53/535 |
| 3,637,095 | 1/1972 | Kampfer | 414/331 |
| 4,057,138 | 11/1977 | Grebe | 198/370.08 |
| 4,379,671 | 4/1983 | Cochran | 414/331 |
| 4,429,795 | 2/1984 | Hawkes | 198/370.08 |
| 4,609,091 | 9/1986 | Dorner | 414/331 X |
| 4,634,333 | 1/1987 | Butterly, Jr. et al. | 414/331 |
| 4,697,974 | 10/1987 | Eltoukhy | 414/331 |
| 4,824,310 | 4/1989 | Kosmowski et al. | 414/331 X |
| 5,058,723 | 10/1991 | Hosch | 198/370.08 |
| 5,159,960 | 11/1992 | Pringle | 414/331 X |
| 5,267,590 | 12/1993 | Pringle | 414/331 X |
| 5,275,272 | 1/1994 | Ydoate | 198/370.08 X |
| 5,310,300 | 5/1994 | Crabb et al. | 414/331 X |
| 5,437,537 | 8/1995 | Sweet et al. | 414/400 |
| 5,595,468 | 1/1997 | Wald | 414/331 |

OTHER PUBLICATIONS

Cannon Equipment Company, Brochure titled "Newspaper Cart Loader and Newspaper Cart Loading Systems".
Cannon Equipment, Brochure titled Reduced Labor and Breakage with an Automated Egg Cart Loader from Cannon.

*Primary Examiner*—David A. Bucci
*Attorney, Agent, or Firm*—Merchant & Gould P.C.

[57] ABSTRACT

A cart loading machine including a loading section for loading objects onto a multi-tiered cart, and an infeed conveyor section for conveying the objects to the loading section. The loading section includes a framework defining an open area for receiving the multi-tiered cart, and a elevator mechanism for vertically moving the cart relative to the framework within the open area. A stationary accumulation table is disposed adjacent to the framework and accumulates an array of the objects thereon. A pusher is associated with the accumulation table for pushing an accumulated array from the accumulation table and onto one of the shelves of the multi-tiered cart. Initially, the cart is raised so that its bottommost shelf is level with the accumulation table, such that when the pusher is actuated, the accumulated array is loaded onto the bottommost shelf. The cart is then lowered until the next shelf is level with the accumulation table, while the next array is being accumulated on the accumulation table. The new array is then pushed by the pusher onto the next shelf. This process is repeated until all of the shelves of the cart are filled.

25 Claims, 5 Drawing Sheets

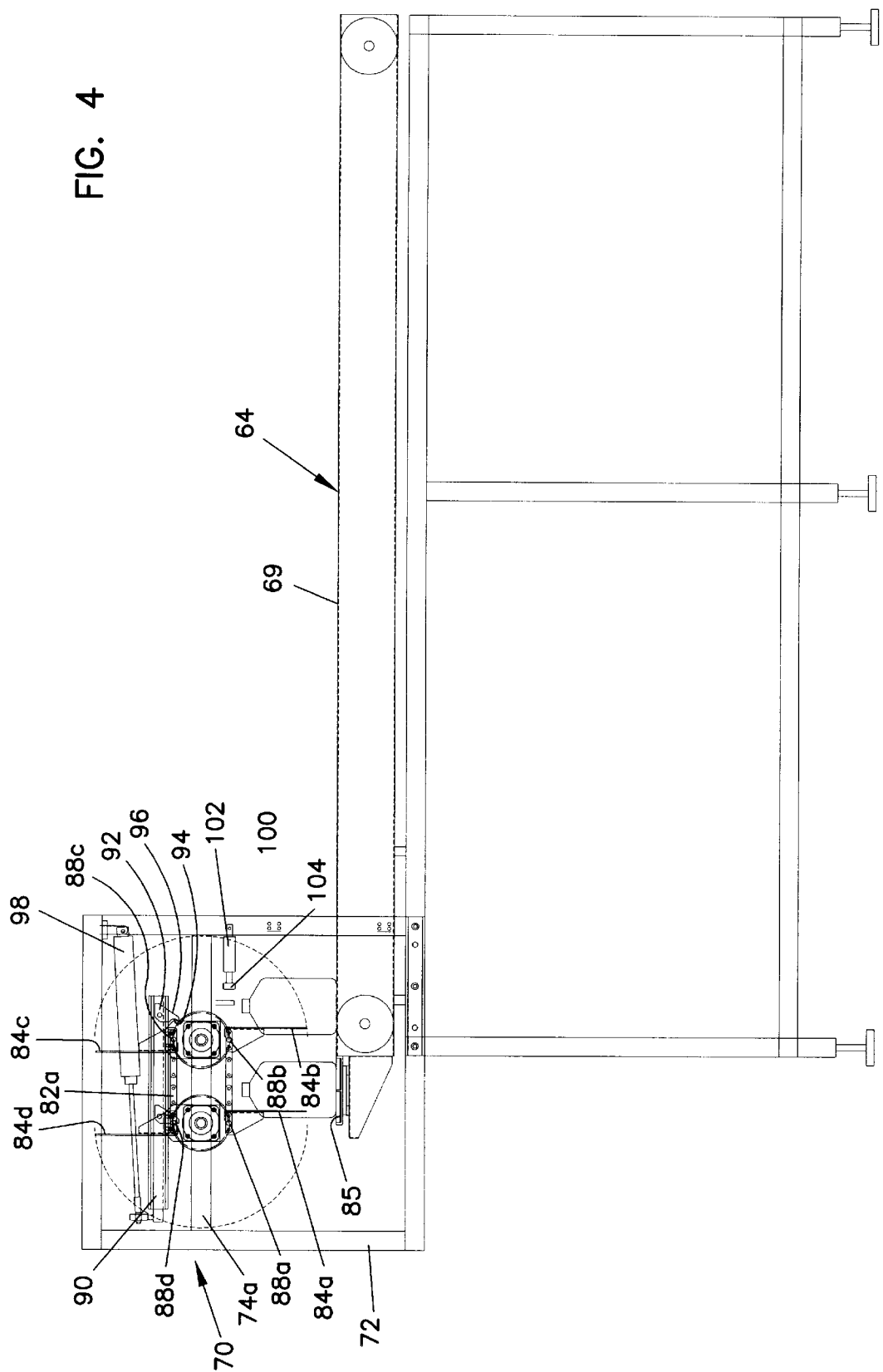

AUTOMATIC CART LOADING MACHINE AND METHOD

FIELD OF THE INVENTION

This invention relates to automated cart loaders for loading objects onto the shelves of multi-tiered, wheeled carts. Automated cart loaders are particularly useful for loading containers of milk onto wheeled carts which can then be easily transported to stores for purchase of the milk by consumers. Cart loaders also have useful applications in other industries where objects are to be loaded onto wheeled carts, such as for loading cartons of eggs and newspaper bundles.

BACKGROUND OF THE INVENTION

A number of machines have been developed in the past for loading multi-tiered carts in a variety of different industries. Each industry has its own unique requirements, and therefore the cart loaders are generally designed so as to satisfy the requirements of the industry with which it is to be used. However, one requirement common to many industries is the need to load a plurality of objects, which are usually arranged in a plurality of rows and columns, onto each shelf of the cart. Therefore, not only must the loading machine perform the actual loading of the objects onto the shelves of the cart, but the machine must also arrange the objects into the plurality of rows and columns. A loading machine performing both of these tasks must do so in as little time as possible, in order to reduce the loading time of the cart, thus saving time and money.

U.S. Pat. No. 3,594,977 to Grasvoll discloses a loading machine in which objects to be loaded are supplied in a single column to a conveyor, which is then vertically raised until level with a plate, the single column then being pushed off of the conveyor and onto the plate. The conveyor is then lowered to receive another column, and then raised upward to the plate at which point the new column is again pushed off the conveyor and onto the plate, next to the first column. This process is repeated until the desired number of columns and rows are arranged on the plate. The machine also raises a multi-tiered cart until its lower shelf is level with the plate. The plate is then actuated forward until it is disposed within the cart, at which point a stripper plate is pivoted down and the plate actuated back to its original position, thus causing the objects to be left in the cart on the lower shelf. The cart is then lowered to the next shelf, and the plate refilled with the columns and rows as before. A problem with this machine, however, is that it is complicated and expensive due to the large number of actuators, and the corresponding control system therefore, needed to move the various parts of the machine, including the conveyor, the plate, and the stripper plate. Further, since the conveyor must be moved up and down numerous times to obtain a full load of objects for each level of the cart, the machine is relatively slow, and is not able to load a cart as fast as would be desired.

Butterly, Jr. et al, U.S. Pat. No. 4,634,333, disclose a machine for loading containers of milk onto a multi-tiered cart. In this machine, the objects to be loaded are arranged onto a moving elevator, with the cart remaining stationary during loading. An actuator at each level of the cart is used to push the objects from the elevator and onto the cart. However, this machine utilizes a large number of actuators, in addition to a complicated mechanism for raising and lowering the elevator, resulting in a complicated and expensive machine. Further, as the elevator must be raised and lowered in order to place objects thereon, this increases the loading time of the cart.

An additional cart loading machine is disclosed by Robertson in U.S. Pat. No. 210,049, in which a multi-tiered cart is moved vertically as its different levels are filled from a platform. However, no mention is made of how the objects are moved from the platform and into the cart, nor how the objects are initially arranged on the platform.

U.S. Pat. No. 3,055,518 to Pearne et al discloses a machine in which each object is loaded one at a time at one level until the level is full, then the cart is moved to the next level to repeat the process. U.S. Pat. No. 4,697,974 to Eltoukhy; U.S. Pat. No. 4,824,310 to Kosmowski et al; and U.S. Pat. No. 5,595,468 to Wald teach machines which load and/or unload a single object for each level of the cart. These machines are not faced with the problem of arranging a plurality of objects prior to loading onto each level.

Therefore a need exists for a cart loading machine which is simple in construction and operation, and which is able to load a cart in a reduced amount of time.

SUMMARY OF THE INVENTION

Therefore, the general purpose of the present invention is to provide a cart loading machine for loading objects onto shelves of a multi-tiered cart, which is of particular use for loading milk containers, egg cartons, and/or newspaper bundles, that is of relatively simple construction and which performs the loading operation at a rapid rate.

A preferred embodiment of the cart loading machine in accordance with the principles of the present invention includes a loading section for loading the objects onto the cart, and an infeed conveyor section for conveying the objects to the loading section. The loading section includes a framework defining an open area for receiving the multi-tiered cart, and means for vertically moving the cart relative to the framework within the open area. A stationary accumulation table is disposed adjacent to the framework and which accumulates an array of the objects thereon. A pusher means is associated with the accumulation table for pushing an accumulated array from the accumulation table and onto one of the shelves of the multi-tiered cart. Initially, the cart is raised upward so that its bottommost shelf is level with the accumulation table, such that when the pusher means is actuated, the accumulated array is loaded onto the bottommost shelf. The cart is then lowered until the next shelf is level with the accumulation table, while simultaneously the next array is being accumulated on the accumulation table. The new array is then pushed by the pusher means onto the next shelf. This process is repeated until all of the shelves of the cart are filled.

The objects to be accumulated are brought to the accumulation table by the infeed conveyor section which includes a rotary conveyor line having an output end disposed adjacent to the accumulation table and an input end remote from the output end. The input end and the output end are disposed at the same level as the accumulation table so that the objects do not have to be raised or lowered for placement upon the table. A rotary pusher assembly is disposed adjacent to the input end for pushing the objects onto the rotary conveyor line one column at a time. The rotary pusher assembly includes an endless drive loop or chain having a plurality of generally planar paddles connected thereto at equally spaced locations around the loop, which engage with the objects and push them onto the rotary conveyor line as the drive loop is rotated. A projection extends from the drive loop adjacent each of the paddles, and the drive loop is driven by a piston and cylinder assembly that drives a drive hook connected thereto such that the drive hook engages one of the projections when the drive hook is driven in a first, driving direction, and the drive hook disengages from the one projection and slides over at least one remaining projection when the drive hook is driven in a second, retraction direction. A stop mechanism is provided which is selectively engageable with at least one of the projections for selectively preventing rotation of the drive loop.

The cart is lifted by a lifting mechanism disposed within the open area and upon which the cart is supported. Locking arms are provided for locking the cart within the lifting mechanism, and lifting arms are connected to the lifting mechanism for lifting a gate that is associated with the cart to provide access to each shelf of the cart. Further, an ejecting mechanism is mounted on the framework for engagement with the cart, whereby the cart can be ejected from the lifting mechanism and open area when the cart is filled. A light curtain sensor mechanism is disposed at an entrance to the open area to sense an item within the entrance and thereby stop operation of the machine when an item is sensed, to ensure safe operation of the machine.

Another feature of the invention includes a tilt plate between the framework and the accumulation table, wherein the plate is pivotable between a vertical position to prevent the array of objects from being pushed off of the table, and a horizontal position to bridge a gap between the table and the shelf that is level therewith and permit the array of objects to be pushed onto the shelf.

Each array of objects on the accumulation table is formed by a plurality of rows and columns, and a sensor is provided for each row in order to sense the presence of a full array of objects. The pusher and the tilt plate will operate to permit loading of one of the shelves only when a full array is detected by the sensor.

The machine is particularly useful for loading milk containers, such as one-half gallon and one gallon cartons and jugs, onto carts. However, the machine is also useful for loading other products, such as egg cartons and newspaper bundles.

Thus it can be seen that by making the accumulation table stationary, and using a conveyor line that is disposed at the same level as the table, a simplified loading machine is obtained, in which fewer parts are actuated and in which the objects to be loaded do not have to be raised or lowered onto the table from the conveyor line. Further, since the objects can be accumulated on the table while the cart is being moved to align the next shelf with the table, the loading time of the entire cart is reduced compared with previous cart loading machines.

These and various other advantages and features of novelty which characterize the invention are pointed out with particularity in the claims annexed hereto and forming a part hereof. However, for a better understanding of the invention, its advantages and objects obtained by its use, reference should be made to the drawings which form a further part hereof, and to the accompanying description, in which there is described a preferred embodiment of the invention.

BRIEF DESCRIPTION OF THE DRAWINGS

FIG. 4 is a side view of the infeed section.

DESCRIPTION OF THE PREFERRED EMBODIMENT

Figure 1:
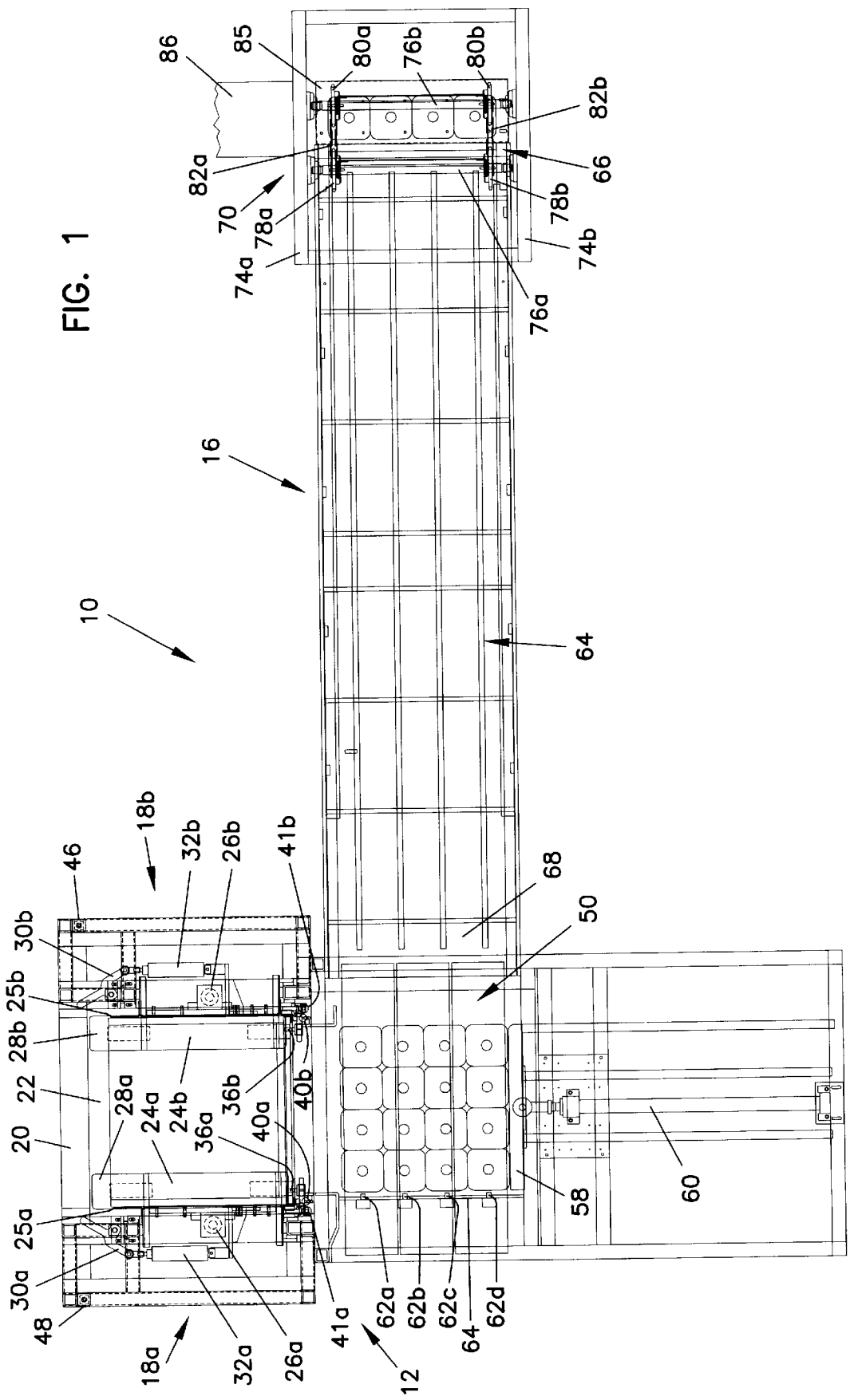
FIG. 1 shows a top view of the cart loading machine, including the loading section and the infeed section.

Referring now to the figures, the cart loading machine as a whole can be seen and is referred to by the numeral 10. The machine 10 includes generally a loading section 12 which receives a multi-tiered cart 14 having a plurality of vertically spaced shelves upon which objects or product are to be loaded, and an infeed section 16 that feeds or inputs the objects to the loading section.

Figure 2:
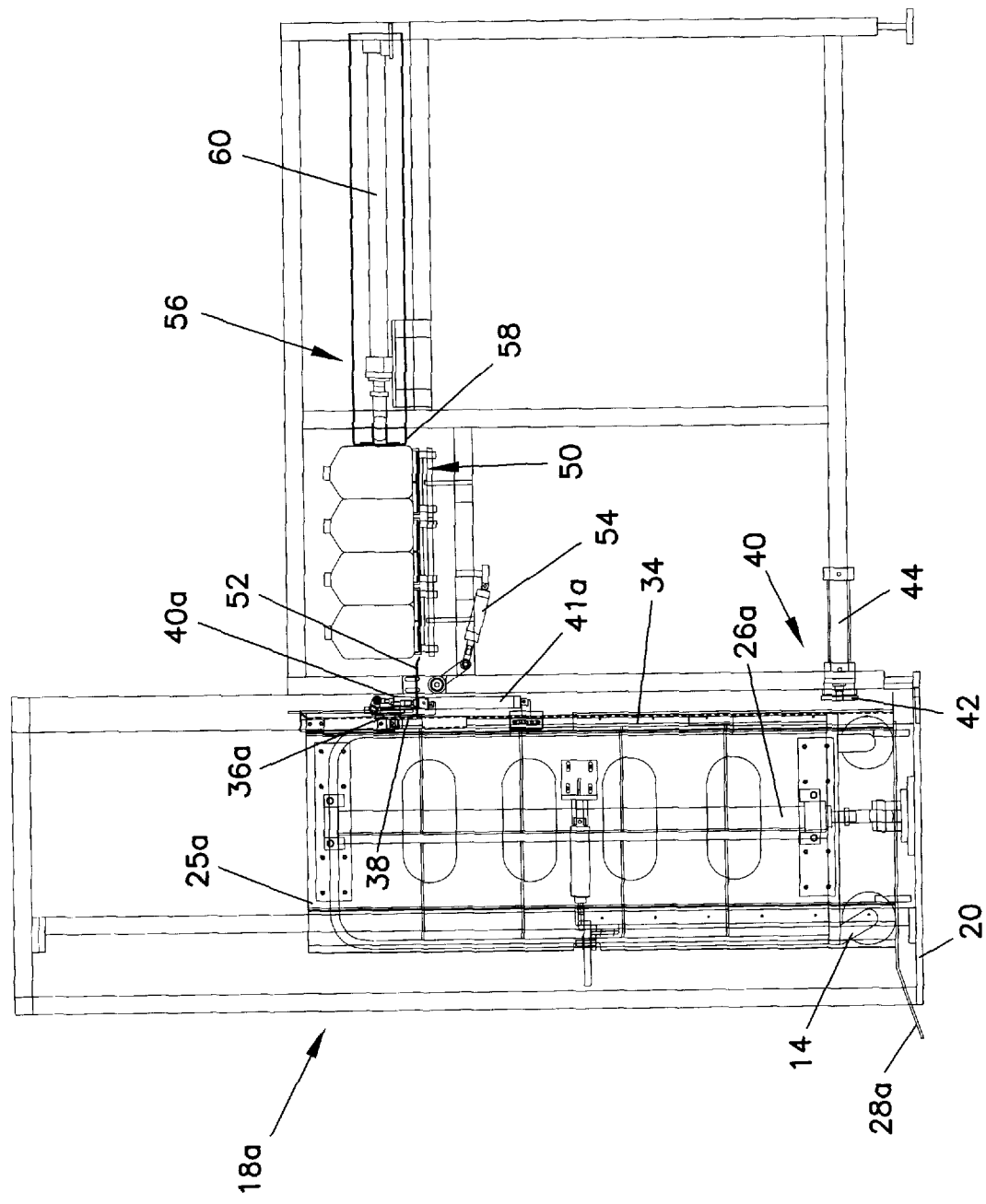
FIG. 2 shows a side view of the loading section, with the cart in a lowered position.
Figure 3:
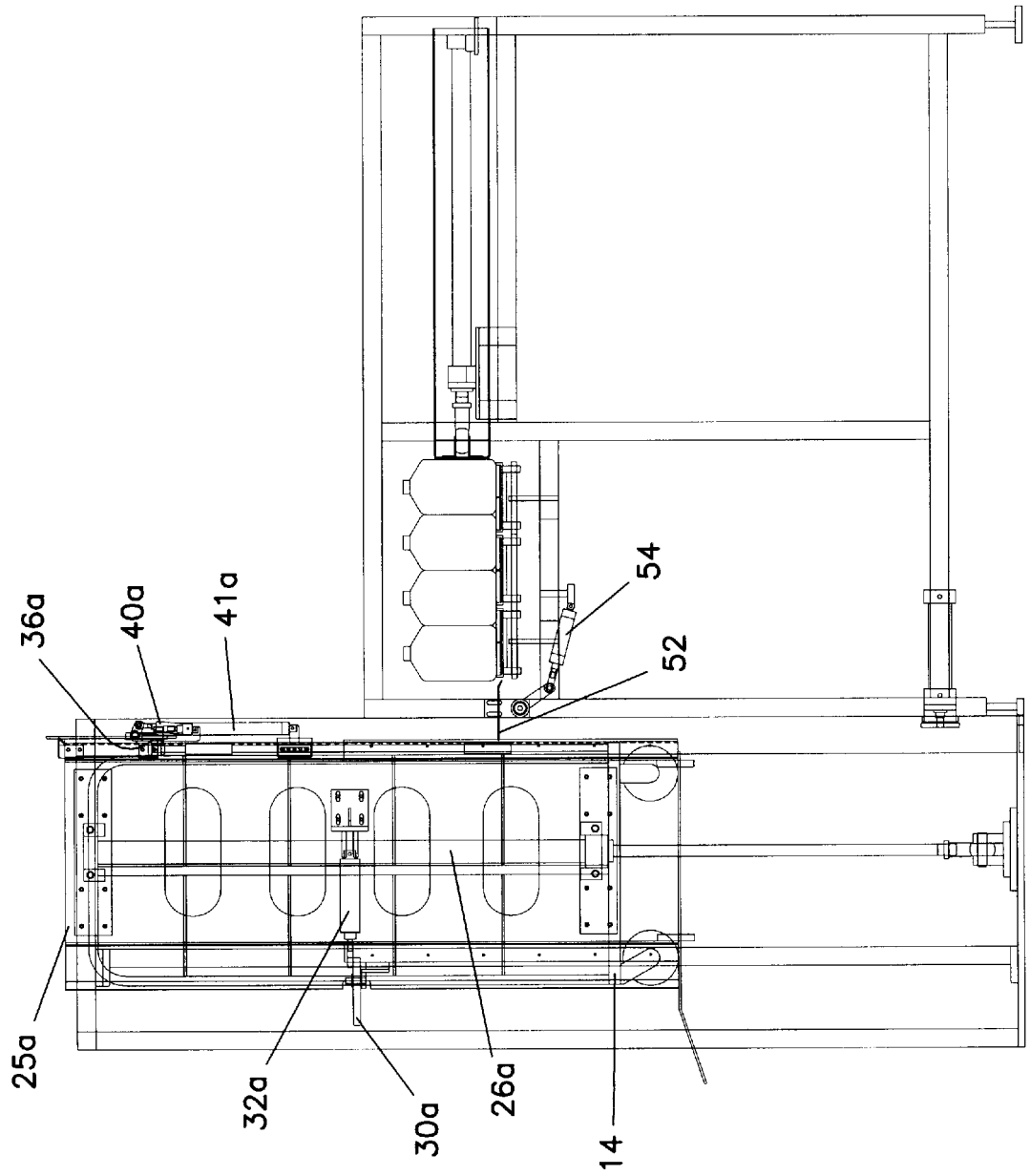
FIG. 3 is a view similar to FIG. 2, but with the cart in a raised position.

As best seen in FIGS. 1–3, the loading section includes a framework composed of a pair of vertical support frames 18a, 18b, which are spaced apart from each other at the bases thereof by cross members 20, thus defining an open, cart receiving area 22 between the frames 18a,b. An elevator mechanism including a pair of spaced, base members 24a, 24b and a pair of spaced side walls 25a,b are disposed with the area 22 above the cross members 20 for vertical movement within the area 22. The members 24a,b are spaced apart a distance such that the wheels on each side of the cart rest on the base members when the cart is positioned within the open area, whereby the cart is moved up and down by the base members as the elevator mechanism moves vertically. Hydraulic or pneumatic actuators 26a,26b are provided for moving the elevator mechanism vertically. One end of each actuator is fastened to base of the frames 18a,b, while the body of each actuator is suitably connected to the side walls 25a,b, such that actuation of each actuator drives the side walls, thus causing the elevator mechanism and cart to move vertically. Each base member includes an inclined ramp 28a,b at the front end thereof to permit the cart to roll onto and off of the members 24a,b.

Pivoting locking arms 30a,b are provided for retaining the cart on the elevator mechanism. Each locking arm is pivotally secured proximate a midpoint thereof to the respective frame such that it is able to pivot relative thereto. Each arm is further slidably mounted on the frame to permit vertical movement with the elevator mechanism as the cart is lifted. One end of each locking arm is connected to a hydraulic or pneumatic actuator 32a,32b which cause each locking arm to pivot between a first, locking position and a second, retracted position. The locking arms are sized and located such that when the arms are pivoted to the locking position, they extend in front of the cart so as to prevent the cart from rolling off of the base members, and when pivoted to the retracted position, they allow the cart to roll off of the base members.

A gate 34 is slidably mounted on the back of the cart 14 such that it can be moved up and down to control access to the shelves of the cart. These types of carts with gates are known in the art, with the gate generally including a plurality of vertically spaced bars thereon. In the normal position of the gate, a single bar is associated with each shelf and located generally a few inches above the shelf in an obstructing position such that loading of each shelf through the back end of the cart is prevented. In order to enable loading of the shelves, the gate must be lifted so that the bars are vertically displaced away from their obstructing position. In order to lift the gate, a pair of lifting arms 36a,36b are connected to the elevator mechanism at the back thereof so that the arms move with the elevator mechanism. The arms are pivotally attached to the elevator mechanism for pivoting movement between an engaged position and a disengaged position, actuated by hydraulic or pneumatic actuators 40a,b that are suitably connected to the elevator mechanism for movement therewith. The arms are also attached to the elevator mechanism for vertical movement relative thereto so as to cause lifting of the gate, actuated by actuators 41a,41b connected to the lifting arms and suitably connected to the elevator mechanism for movement therewith. Each lifting arm 36a,b includes a hook end 38 which, when pivoted to the engaged position, engages the upper bar of the gate 34 when the cart is in its lowest position in the open area. Once the hook end is engaged with the upper bar, the actuators 41a,b are then actuated to cause the arms to move vertically and lift the gate, thus raising the bars so as to permit access to the shelves. As the cart is then moved vertically during the loading process, the gate remains lifted, allowing each shelf to be loaded. Once loading is complete, the gate is lowered so that the bars are again located in their obstructing position above each shelf to prevent the loaded objects from exiting out the back side of the cart.

An ejector ram 40 is disposed between the frames adjacent the bottom ends thereof for pushing the cart out of the open area and down the inclined ramps 28a,b after the cart is fully loaded. The ram 40 includes a pusher plate 42 secured to a hydraulic or pneumatic actuator 44 which is secured on the framework between the two frames 18a,b. The plate 42 is located such that it engages with the bottom of the cart when actuated by the actuator 44, thus pushing the loaded cart off of the base members.

A light curtain sensor assembly including a light source 46 and a light receiver 48 are mounted adjacent an entrance to the open area 22, so as to form a continuous, or semi-continuous, sensor across the entrance. The light source 46 projects a plurality of vertically spaced beams of light across to the light receiver 48 so as to form a curtain of light across the entrance. The sensor assembly is connected with the control system of the machine 10 such that if one of the beams of light is broken or interrupted during operation of the machine by an item within the entrance, the machine will shut down. The sensor assembly thus provides a measure of safety during operation of the machine, by detecting the presence of an item, such as an arm or a leg of the operator of the machine, within the entrance, and shutting down operation of the machine to prevent injury to the operator.

The loading section 12 further includes a stationary accumulation table 50 disposed generally between the frames in alignment with the open area 22 so that communication is provided between the table and the open area. The accumulation table is generally planar, and is disposed at a height such that it is level with the highest shelf of the cart when the cart is in its lowest position in the open area. The table 50 is made from a plurality of sections, preferably three sections, of LP chain material. LP chain material is well known in the prior art and is comprised of a plurality of rollers to enable the objects to easily slide onto and from the table. In use, the accumulation table collects an array of objects or products thereon, with each array including a plurality of rows (extending perpendicular to the base members) and a plurality of columns (extending parallel to the base members). As shown in FIGS. 2–3, a tilt plate 52 is pivotally mounted on the framework between the open area and the accumulation table so as to be able to pivot between a generally vertical position to prevent an array of objects from moving off of the accumulation table, and a horizontal position, in which the plate bridges a gap between the accumulation table and one of the shelves of the cart to permit the array of objects to be moved from the table and onto the shelf. As shown, the plate 52 includes a hydraulic or pneumatic actuator 54 connected thereto for actuating the plate between its horizontal and vertical positions. Disposed at the rear of the accumulation table, opposite the tilt plate, is a pusher assembly 56 composed of a plate 58 and a hydraulic or pneumatic actuator 60 for actuating the plate 58. When the actuator 60 is actuated, the plate 58 pushes the array from the accumulation table and onto the shelf of the cart.

Figure 6:
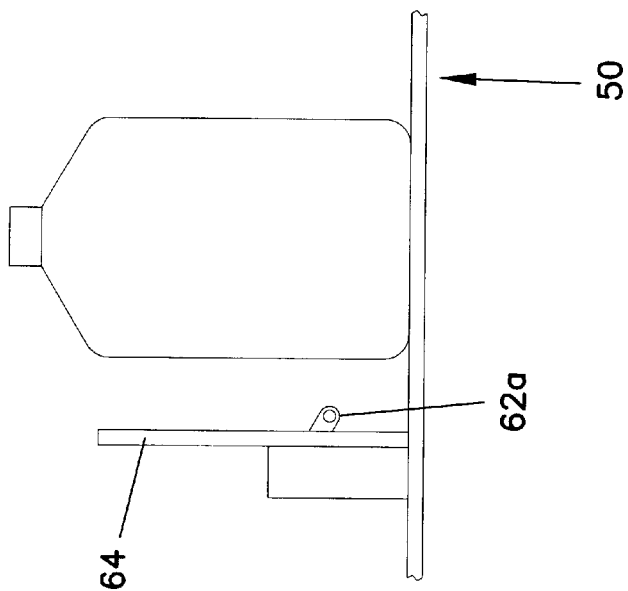
FIG. 6 is a detailed view of a portion of the accumulation table illustrating one of the pivoting sensors attached to the wall about to be engaged by one of the containers in a row.

The accumulation table 50 further includes a sensor assembly for sensing a full array of objects thereon. As illustrated in FIGS. 1 and 6, the sensor assembly includes a pivoting sensor arm 62a–d for each row in the array, with each arm being mounted in a wall 64 forming an end of the table and suitably connected to the control system of the machine such that when an arm is pivoted, the control system is provided with an indication of a full row of objects. As the objects are being accumulated on the table 50, each row of objects moves closer to its respective sensor arm. When each row is full or complete, the first object in each row contacts the pivoting arm associated therewith, thus causing the arm to pivot. Each pivoted arm provides an indication of the presence of a full row of objects. If each arm is pivoted, the control system of the machine knows that a full array of objects is accumulated on the table, and that the machine can proceed to the next step in the loading process. If one or more arms is not pivoted while the remaining arms are pivoted, the control system is provided with an indication that one or more of the rows is not complete, and that a potential problem exists in the accumulation of the objects on the table. The control system can then shut down the machine automatically, or provide a warning to the operator of the machine that a potential problem exists at the accumulation table.

The infeed section 16 supplies the objects to the accumulation table for accumulating the objects thereon. As seen in FIGS. 1 and 4, the infeed section 16 includes a conveyor line 64 having an input end 66 and an output end 68 disposed adjacent the accumulation table 50. The conveyor line 64 includes a rotary conveyor belt 69 of conventional structure for moving objects in columns from the input end to the output end and onto the accumulation table. The input end 66 and output end 68 are disposed vertically at the same level as the accumulation table, so that the objects do not have to be vertically raised or lowered for accumulation on the table.

A rotary pusher assembly 70 is disposed at the input end 66 of the conveyor line 64 for pushing the objects, by columns, onto the conveyor belt 69. The pusher assembly 70 includes a stationary frame 72 mounted at the input end of the conveyor line. A pair of bars 74a,74b extend horizontally in the frame 72 between its ends, with a pair of spaced shafts 76a,76b extending between the bars. The shafts are rotatably mounted at each of their ends in the bars, and sprocket wheels 78a,78b and 80a,80b are fixedly attached to the ends of each shaft. An endless drive chain or loop 82a,82b extends around the sprocket wheels 78a,80a and 78b,80b, respectively. A plurality of paddles 84a–d are rigidly connected at each end thereof to the drive chains 82a,b such that the paddles extend generally perpendicularly from the outside of each chain and rotate with the chains. The paddles 84a–d are equally spaced around the chains, with the spacing between adjacent paddles being such that a column of objects can fit between adjacent paddles. As evident from FIG. 4, as the chains rotate, the paddles rotate therewith, with one paddle engaging a column of objects and thereby pushing the column of objects onto the rotary conveyor belt 69. As the one paddle is pushing the objects onto the belt, the next paddle is rotating into position for pushing the next column onto the belt. The objects are preferably supplied to an infeed table 85 disposed at the input end of the conveyor line 64 by a supply line 86, whereby the objects are gathered on the table 85 in columns for subsequent pushing by the paddles onto the conveyor belt.

Figure 5:
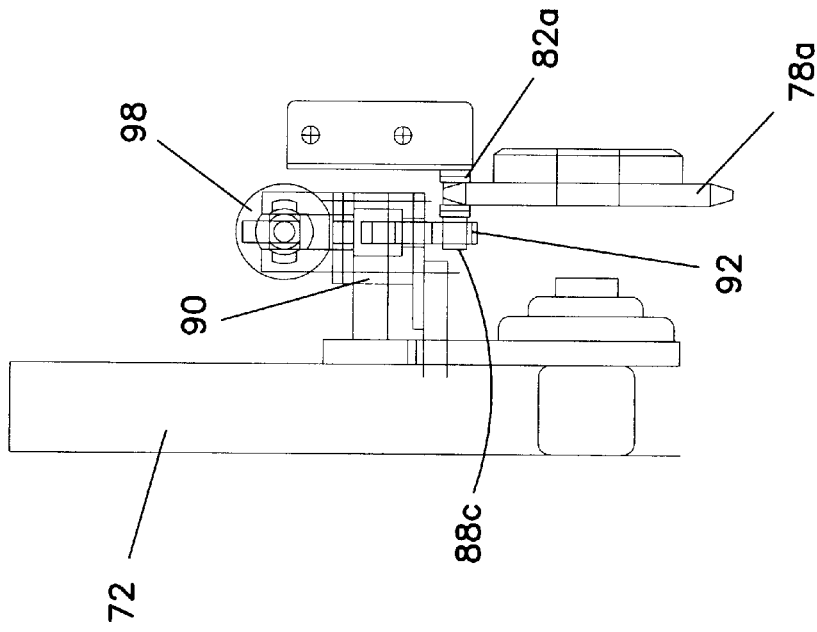
FIG. 5 is an end view of a portion of the rotary pusher assembly looking along the length of the stationary track, illustrating the drive hook at the start of its driving stroke engaged with a projection.

Referring to FIGS. 4 and 5, it can be seen that the chain 82a includes a plurality of round projections 88a–d extending therefrom at equally spaced locations on the chain, with each projection 88a–d being located adjacent a corresponding paddle 84a–d. An elongated, stationary track 90 is mounted within the frame 72 generally above the sprocket wheels 78a,80a, and a drive hook 92 is slidably disposed within the track for sliding movement between its two ends. The drive hook 92 is further attached to the track 90 such that the drive hook can pivot in a clockwise direction from a first position, shown in FIG. 4, with a spring (not shown) biasing the hook back to the first position upon deflection in the clockwise direction from the first position. The drive hook 92 is formed with a curved, hook side 94 for engagement with a respective one of the projections 88a–d and an angled back side 96 the purpose of which will become apparent later.

A hydraulic or pneumatic actuator 98 is mounted within the frame 72 and attached at one end thereof to the drive hook 92 for driving the hook between the ends of the track 90. When the actuator 98 is retracted, the drive hook 92 is at the right end of the track. When the actuator is extended, the drive hook is moved to the left, with the hook side 94 engaging with one of the projections 88a–d and thus rotating the chains 82a,b and paddles. During this actuation phase, the paddles engage with one column of objects and push that column onto the rotary belt. Once the hook is driven all the way to the opposite end of the track, the actuator is retracted, thus moving the drive hook to the right. Due to the angled back side 96 and the pivotal mounting of the drive hook, the drive hook pivots in a clockwise direction as it encounters a projection on the return stroke, thus allowing the drive hook to be returned to the right end of the track without causing further rotation of the paddles. The spring bias acting on the hook biases the hook back into position after passing over a projection. As the drive hook is being returned to the starting position, and therefore the chains and paddles are not being rotated, a new column of objects is being fed to the infeed table 85 for subsequent pushing by one of the paddles onto the conveyor belt on the next driving stroke of the drive hook.

In order to prevent inadvertent rotation of the chains and paddles, such as during the return stroke of the drive hook or at other times when rotation is not desired, a stop mechanism 100 is provided. The stop mechanism is mounted on the frame 72, and includes a hydraulic or pneumatic actuator 102 located adjacent the bottom extent of the drive chain 82a. The actuator 102 is connected to a stop block 104 for engaging with one of the projections on the chain. When the actuator 102 is extended, the block 104 extends to a position adjacent one of the projections on the chain, thus preventing further movement of the projection and chain in a counterclockwise direction. When rotation is to be commenced, the block is retracted by the actuator 102 to permit rotation.

A cart is loaded by rolling an empty cart into the open area of the framework such that it is located within the elevator mechanism with its wheels on the base members. The locking arms 30a,b are then pivoted into position to retain the cart in place. The lifting arms 36a,b are then pivoted to engage the upper bar of the cart gate, and then vertically raised so as to lift the gate and displace the bars to allow access to each shelf. The elevator mechanism is then actuated by the actuators 26a,b so as to raise the cart until its bottommost shelf is level with the accumulation table 50. As the cart is being placed in position and raised, the infeed conveyor section is actuated so as to convey the objects, column by column, to the accumulation table in order to accumulate an array of objects thereon. When the bottommost shelf is in position and an array is accumulated, the tilt plate 52 is actuated to the horizontal position so as to bridge the gap between the accumulation table and the bottommost shelf, and the pusher assembly 56 is actuated so as to push the objects from the table onto the bottom shelf. The pusher assembly is then retracted, and the tilt plate pivoted upward. The cart is then lowered until the next shelf is level with the accumulation table, while simultaneously a new array of objects is being accumulated on the table. The plate 52 is then actuated to the horizontal position and the new array can then be pushed by the pusher assembly onto the shelf. This process repeats itself until the top shelf of the cart is loaded, at which point the elevator mechanism is back in its initial position and the cart is at its starting position. The locking arms can then be lowered and retracted, so that the cart gate is returned to its initial position, and the ejector ram actuated so as to push the loaded cart out of the loading section.

The machine 10 as described herein has been found to be able to achieve a loading rate of approximately 100–120 gallons/minute which is significantly higher than a typical prior art loading rate of about 70 gallons/minute. Therefore, not only is the machine 10 simpler in construction than the prior art loaders, but it is able to load carts at a faster rate. The simplified construction of the machine 10 and its fast loading rate thus result in savings in both time and expense.

It is to be understood that while certain embodiments of the present invention have been illustrated and described, the invention is not limited to the specific forms or arrangements of the parts described and shown.

We claim:

1. A cart loading machine for loading objects onto individual shelves of a multi-tiered cart, comprising:

a loading section including a framework for receiving the multi-tiered cart, and means for vertically moving the cart relative to the framework, the loading section further including a stationary accumulation table disposed adjacent to the framework, the accumulation table being able to accumulate an array of the objects thereon, and a pusher means associated with the accumulation table for pushing an accumulated array from the accumulation table and onto one of the shelves of the multi-tiered cart; and an infeed conveyor section for conveying the objects onto the accumulation table in order to accumulate the array of objects thereon.

2. The cart loading machine according to claim 1, wherein the means for vertically moving comprises a lifting mechanism disposed in an open area defined by the framework, the lifting mechanism being able to support the cart thereon, and further including pivoting locking arms for retaining the cart within the lifting mechanism.

3. The cart loading machine according to claim 2, further including ejector means disposed on the framework for engagement with the cart for pushing the cart off of the lifting mechanism.

4. The cart loading machine according to claim 2, wherein the framework includes an entrance to the open area, and further including sensor means for sensing an item within said entrance.

5. The cart loading machine according to claim 4, wherein said sensor means comprises a light curtain assembly.

6. The cart loading machine according to claim 1, wherein the loading section further includes a tilt plate mounted on the framework adjacent to the stationary accumulation table, said tilt plate being actuatable between a first position to prevent the array of objects from being pushed off of the accumulation table and onto the cart, and a second position to permit the array of objects to be pushed off of the accumulation table and onto the cart.

7. The cart loading machine according to claim 6, wherein in said second position, the tilt plate is generally horizontal so as to bridge a gap between the accumulation table and one of the shelves of the cart.

8. The cart loading machine according to claim 1, wherein the accumulation table includes a sensing means associated therewith for sensing the accumulated array of objects thereon.

9. The cart loading machine according to claim 8, wherein the accumulated array of objects are arranged in a plurality of rows and columns, and said sensing means includes a sensor for each of said rows.

10. The cart loading machine according to claim 1, wherein the infeed conveyor section includes a rotary conveyor line having an output end disposed adjacent the accumulation table and an input end, the infeed conveyor section further including a rotary pusher assembly disposed adjacent the input end for pushing objects onto the rotary conveyor line.

11. The cart loading machine according to claim 10, wherein the input end and the output end of the rotary conveyor line are disposed at the same level as the accumulation table.

12. The cart loading machine according to claim 10, wherein the rotary pusher assembly includes an endless drive loop having a plurality of generally planar paddles connected thereto at equally spaced locations around the loop, and drive means engaged with the drive loop for rotating the drive loop.

13. The cart loading machine according to claim 12, further including a projection extending from the drive loop adjacent each said paddle, and wherein the drive means comprises a piston and cylinder assembly driving a drive hook connected thereto such that the drive hook is capable of being driven in a first, driving direction and a second, retraction direction.

14. The cart loading machine according to claim 13, wherein the drive hook engages one of the projections when the drive hook is driven in the first, driving direction, thus causing the drive loop to rotate, and the drive hook disengages from the one projection and slides over at least one remaining projection when the drive hook is driven in the second, retraction direction.

15. The cart loading machine according to claim 13, further comprising a stop mechanism selectively engageable with at least one of the projections for selectively preventing rotation of the drive loop.

16. A loading section of a cart loading machine for loading arrays of objects onto shelves of a wheeled, multi-tiered cart, comprising:

a framework defining an open area for receiving the multi-tiered cart, and means for vertically moving the cart relative to the framework within the open area, the loading section further including a stationary accumulation table disposed adjacent to the framework, the accumulation table being able to accumulate an array of objects thereon, and a pusher means associated with the accumulation table for pushing an accumulated array from the accumulation table and onto one of the shelves of the multi-tiered cart.

17. The loading section according to claim 16, further including a tilt plate mounted on the framework adjacent to the stationary accumulation table, said tilt plate being actuatable between a first position to prevent the array of objects from being pushed off of the accumulation table, and a second position to permit the array of objects to be pushed off of the accumulation table.

18. The loading section according to claim 17, wherein in said second position, the tilt plate is generally horizontal such that a plane defined by the plate is generally parallel with a plane of the accumulation table.

19. The loading section according to claim 16, wherein the accumulated array of objects are arranged into a plurality of rows and columns, and wherein the accumulation table includes a sensor associated with each row for sensing objects within each row.

20. An infeed conveyor section of a cart loading machine for conveying objects onto an accumulation table of a loading section of the cart loading machine, comprising:

a rotary conveyor line having an output end disposed adjacent the accumulation table and an input end, the input end and the output end being disposed at the same level as the accumulation table; the infeed conveyor section further including a rotary pusher assembly disposed adjacent the input end for pushing objects onto the rotary conveyor line, wherein the rotary pusher assembly includes an endless drive loop having a plurality of generally planar paddles connected thereto at equally spaced locations along the loop, and drive means engaged with the drive loop for rotating the drive loop, the paddles pushing the objects onto the rotary conveyor line as the drive loop is rotated, and further comprising a stop mechanism selectively engageable with the drive loop for preventing rotation thereof.

21. The infeed conveyor section according to claim 20, further including a projection extending from the drive loop adjacent each said paddle, and wherein the drive means comprises a piston and cylinder assembly driving a drive hook connected thereto such that the drive hook is capable of being driven in a first, driving direction and a second, retraction direction, wherein the drive hook engages one of the projections when the drive hook is driven in the first, driving direction, thus causing the drive loop to rotate, and the drive hook disengages from the one projection and slides over at least one remaining projection when the drive hook is driven in the second, retraction direction.

22. The infeed conveyor section according to claim 21, wherein said stop mechanism is selectively engageable with at least one of the projections for selectively preventing rotation of the drive loop.

23. An automatic milk container cart loader for loading milk containers onto a multi-tiered cart, comprising:

a loading section including a framework for receiving the multi-tiered cart, and means for vertically moving the cart relative to the framework, the loading section further including a stationary accumulation table disposed adjacent to the framework, the accumulation table being able to accumulate an array of the milk containers thereon, and a pusher means associated with the accumulation table for pushing an accumulated array from the accumulation table and onto one of the shelves of the multi-tiered cart; and an infeed conveyor section for conveying the milk containers onto the accumulation table in order to accumulate the array of milk containers thereon.

24. A method of loading objects onto shelves of a multi-tiered cart using a cart loading machine having a stationary accumulation table for accumulating an array of the objects thereon and an infeed conveyor for conveying the objects to the accumulation table, the method comprising the steps of:

a) moving the cart vertically until one of the shelves is level with the accumulation table, while simultaneously operating the infeed conveyor to convey objects to the accumulation table until an array of objects is accumulated thereon;

b) pushing the accumulated array of objects from the accumulation table and onto the one shelf;

c) moving the cart downward until a next shelf is level with the accumulation table, while simultaneously operating the infeed conveyor to convey additional objects to the accumulation table until an additional array of objects is accumulated thereon;

d) pushing the additional accumulated array of objects from the accumulation table and onto the next shelf; and e) repeating steps c) and d) until all the remaining shelves of the cart are filled.

25. The method according to claim 24, wherein the one shelf is a bottommost shelf on the cart, and the step of moving the cart vertically comprises moving the cart vertically upward until the bottommost shelf is level with the accumulation table.

* * * * *